(12) United States Patent
Choi et al.

(10) Patent No.: US 12,142,255 B2
(45) Date of Patent: Nov. 12, 2024

(54) GRADIENT-INDEX PHONONIC CRYSTAL FLAT LENS AND DESIGN METHOD FOR SAME

(71) Applicant: KOREA RESEARCH INSTITUTE OF STANDARDS AND SCIENCE, Daejeon (KR)

(72) Inventors: Won Jae Choi, Sejong-si (KR); Miso Kim, Daejeon (KR); Jae Yub Hyun, Daejeon (KR)

(73) Assignee: KOREA RESEARCH INSTITUTE OF STANDARDS AND SCIENCE, Daejeon (KR)

(*) Notice: Subject to any disclaimer, the term of this patent is extended or adjusted under 35 U.S.C. 154(b) by 59 days.

(21) Appl. No.: 17/777,465

(22) PCT Filed: Nov. 11, 2020

(86) PCT No.: PCT/KR2020/015759
§ 371 (c)(1),
(2) Date: May 17, 2022

(87) PCT Pub. No.: WO2021/107461
PCT Pub. Date: Jun. 3, 2021

(65) Prior Publication Data
US 2023/0360629 A1 Nov. 9, 2023

(30) Foreign Application Priority Data
Nov. 25, 2019 (KR) .......................... 10-2019-0152553

(51) Int. Cl.
*G10K 11/30* (2006.01)
*G02B 1/00* (2006.01)
*G10K 11/24* (2006.01)

(52) U.S. Cl.
CPC .............. *G10K 11/30* (2013.01); *G02B 1/005* (2013.01); *G10K 11/24* (2013.01)

(58) Field of Classification Search
CPC ............ G02B 3/00; G02B 1/00; G02B 1/005; G10K 11/30; G10K 11/24; G10K 11/18; H01Q 15/00
See application file for complete search history.

(56) References Cited

U.S. PATENT DOCUMENTS 7,292,740 B1 * 11/2007 Barker .................... G02F 1/125
  385/9
7,733,198 B1 * 6/2010 Olsson ................... G10K 11/20
  333/187

(Continued)

FOREIGN PATENT DOCUMENTS

CN 212380102 U * 1/2021
CN 218896470 U * 4/2023

(Continued)

OTHER PUBLICATIONS

International Search Report from related WIPO in Application No. PCT/KR2020/015759 dated Feb. 22, 2021, 6 pages.

(Continued)

*Primary Examiner* — Edgardo San Martin
(74) *Attorney, Agent, or Firm* — DILWORTH IP, LLC

(57) ABSTRACT

A gradient-index phononic crystal flat lens which controls the behavior of an acoustic wave having a designated frequency. The gradient-index phononic crystal flat lens may include one or more super cells each having a plurality of layers stacked in a vertical direction according to a target gradient index profile, wherein each of the layers is composed of an aggregate in which unit cells having scatterers formed with the same size in the centers thereof are arranged in a horizontal direction. The one or more super cells may each include a divider provided between the neighboring (Continued)

layers, and configured to force the acoustic wave to propagate in the horizontal direction within the gradient-index phononic crystal flat lens.

11 Claims, 8 Drawing Sheets

(56) References Cited

U.S. PATENT DOCUMENTS

| | | | | |
|---|---|---|---|---|
| 8,054,145 | B2 * | 11/2011 | Mohammadi | H03H 9/02645 |
| | | | | 333/248 |
| 8,094,023 | B1 * | 1/2012 | El-Kady | G08B 13/14 |
| | | | | 340/568.1 |
| 8,833,510 | B2 * | 9/2014 | Koh | F16F 15/02 |
| | | | | 181/207 |
| 9,595,653 | B2 * | 3/2017 | Mitrovic | H10N 10/01 |
| 10,281,333 | B2 * | 5/2019 | Takahashi | G01J 5/14 |
| 10,783,871 | B2 * | 9/2020 | Norris | G10K 11/30 |
| 11,100,914 | B1 * | 8/2021 | Perahia | G10K 11/18 |
| 11,244,667 | B1 * | 2/2022 | Perahia | G10K 11/04 |
| 2013/0025961 | A1 | 1/2013 | Koh et al. | |

FOREIGN PATENT DOCUMENTS

| | | | | |
|---|---|---|---|---|
| CN | 108847213 | B * | 5/2023 | G10K 11/18 |
| EP | 2933225 | A1 | 10/2015 | |
| JP | 2015-016124 | A | 1/2015 | |
| JP | 2018-517937 | A | 7/2018 | |
| KR | 10-2002-0093023 | A | 7/2008 | |
| KR | 10-2014-0108032 | A | 9/2014 | |
| KR | 10-2017-0011677 | A | 11/2017 | |
| KR | 10-2019-0129570 | A | 11/2019 | |
| KR | 102570123 | B1 * | 8/2023 | |
| WO | WO-2021112400 | A1 * | 6/2021 | |

OTHER PUBLICATIONS

Hyun et al., Gradient-index phononic crystals for highly dense flexural energy harvesting, Applied Physics Letters, vol. 115, No. 17, 173901, Oct. 21, 2019, 6 pages.

Lin et al., Gradient-index phononic crystals, Physical Review B, vol. 79, No. 9, 094302, Mar. 18, 2009, 7 pages.

* cited by examiner

GRADIENT-INDEX PHONONIC CRYSTAL FLAT LENS AND DESIGN METHOD FOR SAME

FIELD OF THE INVENTION

The present disclosure relates to a gradient-index phononic crystal flat lens and a design method for the same, and more particularly, to a gradient-index phononic crystal flat lens which can control the behavior of an acoustic wave incident thereon by controlling the phase of the acoustic wave, and a design method for the same.

BACKGROUND OF THE INVENTION

Metamaterials are structures designed to implement a wave characteristic such as a negative gradient index, which does not occur in nature, by using periodic artificial structures. In the past, research on metamaterials had been actively conducted in the electromagnetic field. Recently, however, the research on metamaterials has been rapidly moved to the acoustic field, while research is actively conducted on phononic crystals using the wave characteristic of an acoustic wave. For example, the phononic crystals may be used to minimally focus sound on a region smaller than a wavelength, freely change a propagation path, or improve a sound wave or ultrasonic wave imaging quality. To this end, a design technology is necessarily required for an artificial structure which adjust the modulus of can freely elasticity, the density, and the gradient index thereof through a periodic arrangement of structures smaller than a wavelength.

Furthermore, there is a need for the development of phononic crystals serving as a lens, which can variously control the behavior of an acoustic wave to propagate through a medium with physical vibrations of particles forming the medium.

SUMMARY OF THE INVENTION

Technical Problem

FIG. 1 is a diagram for describing the principle of a flat lens. FIG. 1 illustrates a flat lens interposed between a first medium Ωi through which an acoustic wave can propagate and a second medium Ωt through which an acoustic wave can propagate. Here, the first medium, the second medium, and the flat lens may become media through which the acoustic wave can propagate. The flat lens is a flat structure through which an acoustic wave incident at an angle θi on a surface abutting on the first medium is refracted at an angle θi on a surface abutting on the second medium.

Various embodiments disclosed in this document may provide a flat lens which can control the behavior of an acoustic wave, by using gradient-index phononic crystals having various structural design characteristics.

Various embodiments disclosed in this document may provide a gradient-index phononic crystal flat lens which is designed through accurate phase calculation of layers by separating the respective layers for gradient index profiles such that an acoustic wave is forced to propagate only in one direction, in order to remove complexity when predicting wave propagation for gradient-index phonic crystals, and can control the phase of the acoustic wave.

Furthermore, various embodiments may provide a design method for a gradient-index phononic crystal flat lens, which can control the phase of an acoustic wave by accurately calculating the phase of the acoustic wave passing through each layer of the phononic crystal flat lens.

Furthermore, various embodiments may provide a gradient-index phononic crystal flat lens serving as an Axicon lens in an optical wave that changes an acoustic wave, which propagates as a plane wave, to a Bessel beam, and a gradient-index phononic crystal flat lens serving as a collimator which changes an acoustic wave, propagating from a source point, to a plane wave.

The technical problems of the present disclosure are not limited to those mentioned above, and other technical problems which are not mentioned can be clearly understood by the person skilled in the art from the following descriptions.

Technical Solution

According to the present disclosure for implementing the aforementioned object, there is provided a gradient-index phononic crystal flat lens which controls the behavior of an acoustic wave having a designated frequency. The gradient-index phononic crystal flat lens may include one or more super cells each having a plurality of layers stacked in a vertical direction according to a target gradient index profile, wherein each of the layers is composed of an aggregate in which unit cells having scatterers formed with the same size in the centers thereof are arranged in a horizontal direction. The one or more super cells may each include a divider provided between the neighboring layers, and configured to force the acoustic wave to propagate in the horizontal direction within the gradient-index phononic crystal flat lens.

In various embodiments, the scatterer formed in the center of the unit cell may include a circular hole.

In various embedment's, the divider may include a bar-shaped hole.

In various embodiments, the width of the super cell may be decided so that the acoustic waves propagating through the layer with the minimum gradient index and the layer with the maximum gradient index, respectively, have a phase difference of $2\pi$ therebetween.

In an embodiment, the target gradient index profile may be linearly changed in the range between the minimum gradient index and the maximum gradient index.

In an embodiment, the super cell may include a first super cell and a second super cell, and the first super cell may be stacked over the second super cell such that the gradient index profile of the first super cell and the gradient index profile of the second super cell become symmetrical with each other.

In another embodiment, the target gradient index profile may be decided by the following equation:

$$n(y) = \frac{\sqrt{y^2 + F^2}}{W} + n(0).$$

Here, n(y) represents the target gradient index profile of the super cell in a Y-axis corresponding to the vertical direction, W represents the width of the super cell, F represents a linear distance between the super cell and a wave source configured to form the acoustic wave, and n(0) represents a gradient index when the height position of the super cell correspond to an axis of y=0.

In another embodiment, the super cell may include a third super cell, a fourth supper cell, a fifth super cell, and a sixth super cell, the third and fourth super cells may be stacked so as to be symmetrical with each other with respect to the axis of y=0, the fifth super cell may be stacked over the third super cell, and the sixth super cell may be stacked under the fourth super cell so as to be symmetrical with the fifth super cell with respect to the axis of y=0.

According to the present disclosure for implementing the aforementioned object, there is provided a design method for a gradient-index phononic crystal flat lens which controls the behavior of an acoustic wave having a designated frequency. The design method may include: calculating the maximum gradient index and the minimum gradient index which a unit cell corresponding to one unit of the gradient-index phononic crystal flat lens is able to have; calculating the width and height of a super cell having a plurality of layers stacked in a vertical direction with a target gradient index profile, wherein each of the layers is composed of an aggregate in which unit cells having scatterers formed with the same size in the centers thereof are arranged in a horizontal direction; deciding the sizes of the scatterers of the unit cells arranged in the layer such that the sizes coincide with the target gradient index profile; and forming the scatterer with the decided size and a divider in the unit cell, the divider being provided between the neighboring layers.

The scatterer formed in the center of the unit cell may include a circular hole.

The divider may include a bar-shaped hole.

The calculating of the width and height of the super cell comprises calculating the width of the super cell such that the acoustic waves propagating through the layer with the minimum gradient index and the layer with the maximum gradient index, respectively, have a phase difference of $2\pi$ therebetween.

Advantageous Effects

The gradient-index phononic crystal flat lens according to various embodiments may be designed through accurate phase calculation of layers by separating the layers such that an acoustic wave is forced to propagate only in one direction, thereby easily predicting wave propagation for gradient-index phonic crystals, and variously controlling the phase of the acoustic wave.

The design method for the gradient-index phononic crystal flat lens according to various embodiments may be applied to design methods for various types of lenses which can control the behavior of an acoustic wave through accurate phase calculation of acoustic waves passing through the respective layers of the gradient-index phononic crystal flat lens.

The effects of the present disclosure are not limited to the above-mentioned effects, and the other effects which are not mentioned herein will be clearly understood from the following descriptions by those skilled in the art.

DETAILED DESCRIPTION OF THE INVENTION

Figure 1:
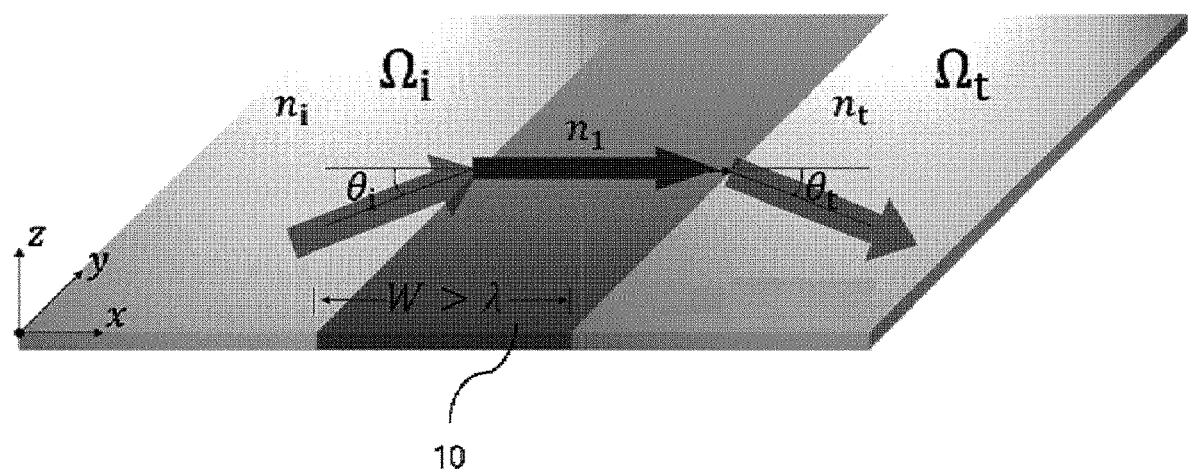
FIG. 1 is a diagram for describing the principle of a flat lens.

In various embodiments, there is provided a gradient-index phononic crystal flat lens which controls the behavior of an acoustic wave having a designated frequency. The gradient-index phononic crystal flat lens may include one or more super cells each having a plurality of layers stacked in a vertical direction according to a target gradient index profile, wherein each of the layers is composed of an aggregate in which unit cells having scatterers formed with the same size in the centers thereof are arranged in a horizontal direction. The one or more super cells may each include a divider provided between the neighboring layers, and configured to force the acoustic wave to propagate in the horizontal direction within the gradient-index phononic crystal flat lens.

In various embodiments, the scatterer formed in the center of the unit cell may include a circular hole.

In various embodiments, the divider may include a bar-shaped hole.

In various embodiments, the width of the super cell may be decided so that the acoustic waves propagating through the layer with the minimum gradient index and the layer with the maximum gradient index, respectively, have a phase difference of $2\pi$ therebetween.

In an embodiment, the target gradient index profile may linearly change within the range from the minimum gradient index to the maximum gradient index.

In an embodiment, the super cell may include a first super cell and a second super cell, and the first super cell may be stacked over the second super cell such that the gradient index profile of the first super cell and the gradient index profile of the second super cell become symmetrical with each other.

In another embodiment, the target gradient index profile is decided by the following equation:

$$n(y) = \frac{\sqrt{y^2 + F^2}}{W} + n(0).$$

Here, n(y) represents the target gradient index profile of the super cell in a Y-axis corresponding to the vertical direction, W represents the width of the super cell, F represents a linear distance between the super cell and a wave source configured to form the acoustic wave, and n(0) represents a gradient index when the height position of the super cell correspond to an axis of y=0.

In an embodiment, the super cell may include a third super cell, a fourth super cell, a fifth super cell, and a sixth super cell, the third super cell and the fourth super cell may be stacked so as to be symmetrical with each other with respect to the axis of y=0, the fifth super cell may be stacked over the third super cell, and the sixth super cell may be stacked under the fourth super cell so as to be symmetrical with the fifth super cell with respect to the axis of y=0.

In various embodiments, there is provided a sign method for a gradient-index phononic crystal flat lens which controls the behavior of an acoustic wave having a designated frequency. The design method may include: calculating the maximum gradient index and the minimum gradient index which a unit cell corresponding to one unit of the gradient-index phononic crystal flat lens is able to have; calculating the width and height of a super cell having a plurality of layers stacked in a vertical direction with a target gradient index profile, wherein each of the layers is composed of an aggregate in which unit cells having scatterers formed with the same size in the centers thereof are arranged in a horizontal direction; deciding the sizes of the scatterers of the unit cells arranged in the layer such that the sizes coincide with the target gradient index profile; and forming the scatterer with the decided size and a divider in the unit cell, the divider being provided between the neighboring layers.

In various embodiments, the scatterer formed in the center of the unit cell may include a circular hole.

In various embodiments, the divider may include a bar-shaped hole with a predetermined thickness.

In various embodiments, the calculating of the width and height of the super cell may include calculating the width of the super cell such that the acoustic waves propagating through the layer with the minimum gradient index and the layer with the maximum gradient index, respectively, have a phase difference of $2\pi$ therebetween.

MODE FOR INVENTION

Hereafter, various embodiments of this document will be described with reference to the accompanying drawings.

The various embodiments of this document and the terms used herein do not intend to limit technical features described in this document to specific embodiments, but it should be understood that various modifications, equivalents or substitutes of the corresponding embodiments are included. In relation to the descriptions of the drawings, like reference numerals may be used for similar or related components. The singular form of a noun corresponding to an item may include one or more items unless clearly referred to contextually differently. In this document, each of phases such as "A or B", "at least one of A and B", "at least one of A or B", "A, B or C", "at least one of A, B and C", and "at least one of A, B, or C" may include any one or all possible combinations of items listed with the corresponding phrase among the phrases. The terms such as "first" and "second" may be simply used to distinguish corresponding components from other components, and do not limit the corresponding components in terms of another aspect (for example, importance or order).

Figure 2:
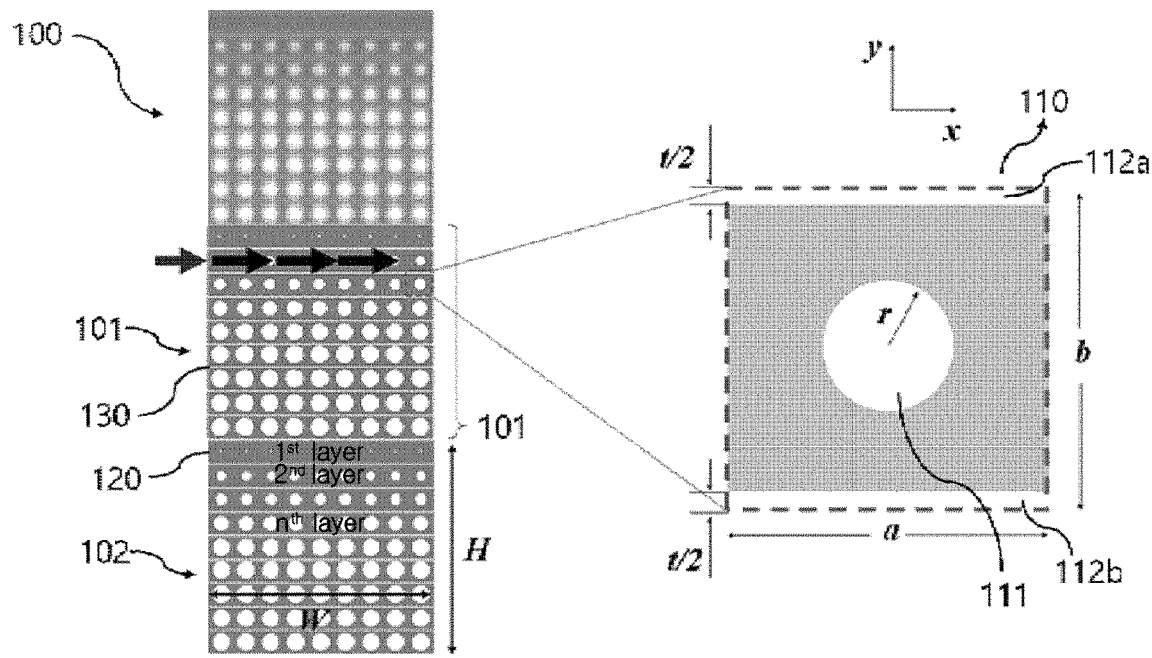
FIG. 2 is a top view of a gradient-index phononic crystal flat lens according to various embodiments.

FIG. 2 is a top view of a gradient-index phononic crystal flat lens according to various embodiments.

Referring to FIG. 2, a gradient-index phononic crystal flat lens 100 according to various embodiments includes one or more super cells 101 and 102 each having a plurality of layers stacked in a vertical direction (Y-axis direction) with a target gradient index profile, wherein each of the layers is composed of an aggregate 120 in which unit cells 110 having scatterers 111 formed in the centers thereof with the same size are arranged in a horizontal direction (X-axis direction). The super cell includes a divider 130 which is provided between the neighboring layers, and forces an acoustic wave to propagate in the horizontal direction (X-axis direction), corresponding to the arrangement direction of the aggregate, inside the gradient-index phononic crystal flat lens, thereby controlling the behavior of the acoustic wave having a designated frequency. The acoustic wave is a wave including an elastic wave with vibrations which are temporally or spatially spread, the vibrations being caused by a force which is generated when the positions of particles forming an elastic object are changed by an external force applied to the elastic object and the particles are intended to return to the original state. The elastic wave is a wave including a flexural wave or bending wave which is generated by a bending operation of a solid medium with bending stiffness.

In various embodiments, the gradient-index phononic crystal flat lens may include the one or more super cells 101 and 102 having a predetermined width W and height H, and the one or more super cells may be stacked with a designated periodic characteristic. The super cells 101 and 102 may each include the plurality of layers stacked in the Y-axis direction with a target gradient index profile and the divider 130 provided between the neighboring layers. Each of the layers may have a target gradient index for an acoustic wave having a designed frequency, and force an acoustic wave, incident thereon, to propagate in one designated direction. Each of the layers may include the aggregate 120 having the plurality of unit cells 110 arranged in the horizontal direction. The plurality of unit cells 110 may each have the scatterer 111 formed in the center thereof, and portions 112a and 112b of the divider formed at the top and bottom thereof. In this case, each of the layers included in the super cell may implement the target gradient index for the acoustic wave having the designated frequency by adjusting the size of the scatterer 111 formed in the center of the unit cell, and disconnect the neighboring layers through the divider formed at the top or bottom of the unit cell such that the acoustic wave is forced to propagate only in one direction.

In various embodiments, as illustrated in FIG. 2, the unit cell 110 may include the scatterer 111 formed as a circular hole with a radius of r and located in the center of a rectangle with a horizontal length of a and a vertical length of b, and bar-shaped holes formed at the top and bottom thereof, respectively, and having a width of t/2 corresponding to a half of the divider. The plurality of unit cells having the circular holes formed therein with the same radius may be arranged in the horizontal direction to constitute one aggregate 120. The aggregate 120 may become one layer as an intermediate constituent unit constituting the super cell which is a constituent unit of the gradient-index phononic crystal flat lens.

In various embodiments, the width W of the gradient-index phononic crystal flat lens 100 may be decided by the width W of the super cell. The width W of the super cell may be decided so that a phase difference between the layer with the highest gradient index and the layer with the lowest gradient index, among the plurality of layers included in the super cells 101 and 102, becomes $2\pi$, in order to perfectly control the acoustic wave. In the super cell illustrated in FIG.

2, the uppermost layer may have the smallest scatterer formed therein and thus have a minimum gradient index which can be accomplished by the unit cell, and the lowermost layer may have the largest scatterer formed therein and thus have a maximum gradient index which can be accomplished by the unit cell. In this case, the width W of the super cell may be decided so that the phase difference between the acoustic waves propagating through the uppermost layer having the minimum gradient index and the lowermost layer having the maximum gradient index, respectively, becomes $2\pi$.

In various embodiments, the height H of the super cells 101 and 102 may be decided in relation to the wavelength $\lambda$ of an acoustic wave having a designated frequency. Since the height H of the super cell may differ depending on the type of the flat lens, the height H of the super cell will be described in the following embodiments.

In various embodiments, the gradient-index phononic crystal flat lens may be formed on an aluminum plate with a predetermined thickness, the aluminum plate being a medium through which an acoustic wave can propagate.

A gradient-index phononic crystal flat lens 200 according to an embodiment may control the behavior of an acoustic wave incident in a vertical direction such that refracted waves exiting at angles $-\theta$ and $\theta$ overlap each other and exit in the form of a Bessel beam.

A gradient-index phononic crystal flat lens 300 according to another embodiment may control the behavior of an acoustic wave, such that an acoustic wave propagating as the wavefront of a concentric circle from a source point is incident on the gradient-index phononic crystal flat lens, and exits as a plane wave. In this case, the gradient-index phononic crystal flat lens 300 according to the another embodiment may be a collimator.

Figure 3:
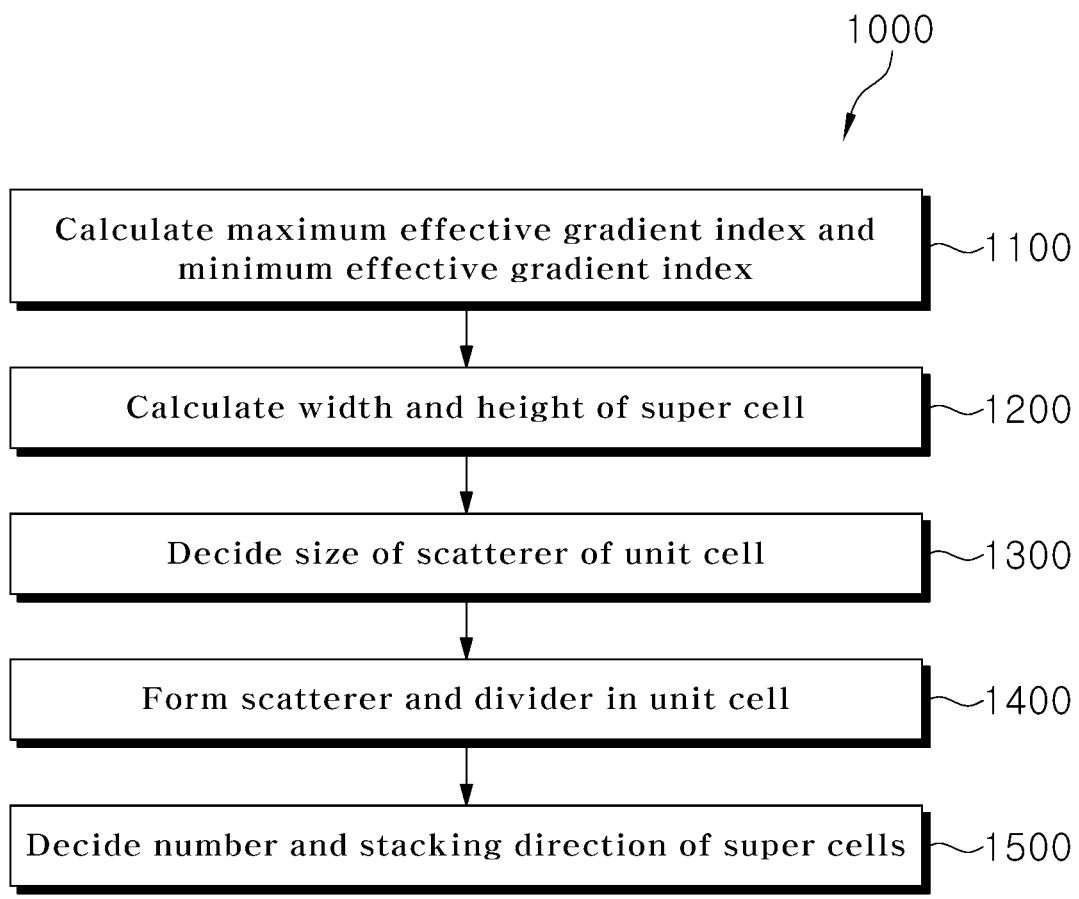
FIG. 3 is a flowchart illustrating a design method for a gradient-index phononic crystal flat lens according to various embodiments.

FIG. 3 is a flowchart illustrating a design method for a gradient-index phononic crystal flat lens according to various embodiments.

Referring to FIG. 3, a design method 1000 of a gradient-index phononic crystal flat lens according to various embodiments may include a process 1100 of calculating the maximum effective gradient index and the minimum effective gradient index, which a unit cell may have, a process 1200 of calculating the width and height of a super cell, a process 1300 of deciding the size of a scatterer of the unit cell, a process 1400 of forming the scatterer and a divider in the unit cell, and a process 1500 of deciding the number of super cells and the stacking direction of the super cells.

In various embodiments, the process 1100 may include calculating the maximum gradient index and the minimum gradient index, which can be accomplished by the unit cell 110 corresponding to the smallest unit constituting the gradient-index phononic crystal flat lens 100. For example, when the unit cell includes a scatterer formed as a circular hole in the center thereof, the unit cell may have the minimum gradient index in case that the diameter of the scatterer is 0, and have the maximum gradient index in case that the diameter of the scatterer is as largest as possible. In order to decide the maximum gradient index, the horizontal and vertical lengths of the unit cell need to be decided. The horizontal and vertical lengths of the unit cell may be decided by calculating the wavelength $\lambda$ of an acoustic wave propagating at a designated frequency (e.g. 50 kHz) in a plate with a predetermined thickness (e.g. 2 mm).

In various embodiments, the process 1200 may include calculating the widths and heights of the super cells 101 and 102 each having a plurality of layers stacked in a vertical direction with a target gradient index profile, wherein each of the layers is composed of the aggregate 120 in which the unit cells 110 having the scatterers 111 formed with the same size in the centers thereof are arranged in a horizontal direction. The width W of the super cell may be calculated through a difference between the maximum gradient index and the minimum gradient index, which have been calculated in the process 1100, as expressed by Equation 1 below.

$$W=2\pi/(k_0(n_{max}-n_{min}))$$  Equation 1

Here, $n_{max}$ represents the maximum gradient index, $n_{min}$ represents the minimum gradient index, and k0 represents the wave number of an acoustic wave having a designated frequency.

In various embodiments, as the widths W of the super cells 101 and 102 are calculated through the difference between the maximum gradient index and the minimum gradient index, the super cells may be designed so that the layer with the maximum gradient index and the layer with the minimum gradient index have a phase difference of $2\pi$ therebetween.

The height H of the super cell may be differently calculated depending on the target gradient index profile, i.e. the purpose of the gradient-index phononic crystal flat lens in which the super cells are stacked.

Figure 4:
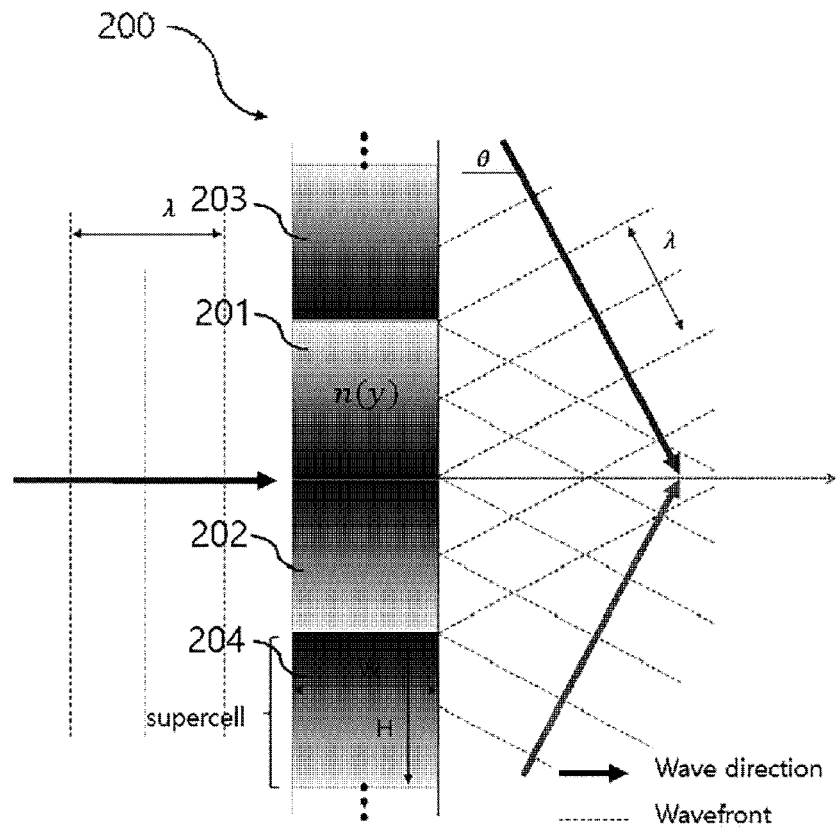
FIG. 4 is a diagram for describing a gradient-index phononic crystal flat lens according to an embodiment.

FIG. 4 is a diagram for describing a gradient-index phononic crystal flat lens according to an embodiment.

Referring to FIG. 4, the gradient-index phononic crystal flat lens 200 according to an embodiment aims at controlling the behavior of an acoustic wave incident in a vertical direction such that refracted waves exiting at angles $-\theta$ and $\theta$ overlap each other, and then exit in the form of a Bessel beam. In this case, the heights H of super cells 201 to 204 may be calculated by Equation 2 using the wavelength $\lambda$ and refraction angle $\theta$ of an acoustic wave which propagates at a designated frequency (e.g. 50 kHz).

$$H=\lambda/\sin\theta$$  Equation 2

Figure 7:
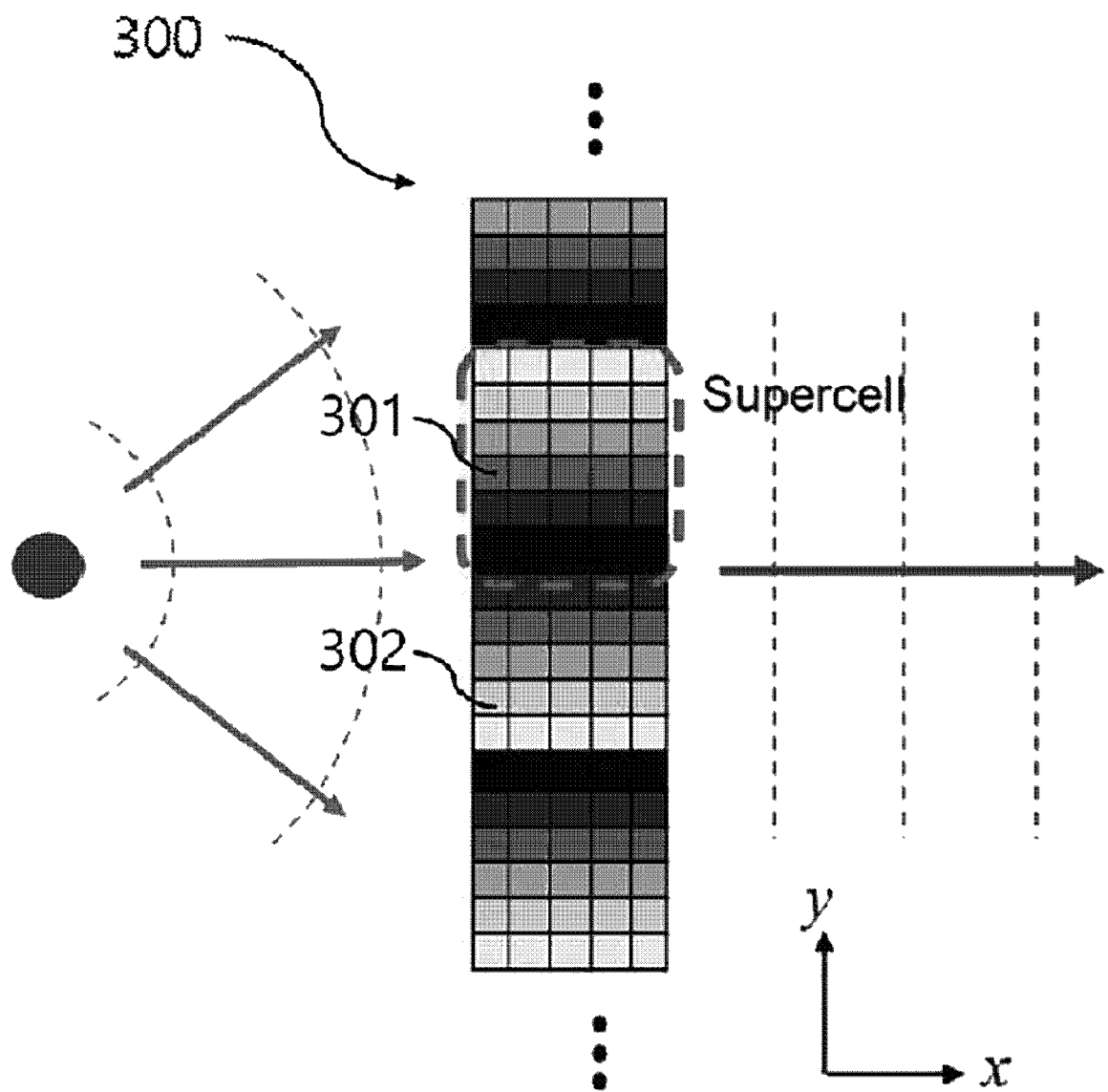
FIG. 7 is a diagram for describing a gradient-index phononic crystal flat lens according to another embodiment.
Figure 8:
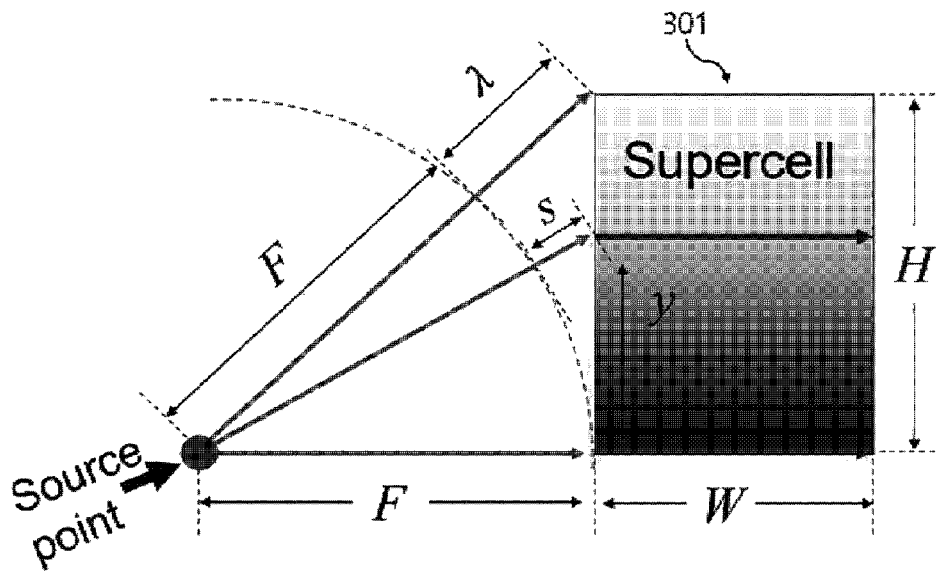
FIG. 8 is a diagram for describing the design principle of the gradient-index phononic crystal flat lens according to the another embodiment.

FIG. 7 is a diagram for describing a gradient-index phononic crystal flat lens according to another embodiment, and FIG. 8 is a diagram for describing the design principle of the gradient-index phononic crystal flat lens according to the another embodiment.

Referring to FIGS. 7 and 8, the gradient-index phononic crystal flat lens 300 according to the another embodiment aims at controlling the behavior of an acoustic wave, such that the acoustic wave propagating as the wavefront of a concentric circle from a source point is incident thereon, and exits as a plane wave. The gradient-index phononic crystal flat lens according to the another embodiment may be a collimator. In this case, as illustrated in FIG. 8, the heights H of super cells 301 to 304 may be calculated by Equation 3 using the focal distance of the collimator and the wavelength $\lambda$ of the acoustic wave propagating at a designated frequency (e.g. 50 kHz).

$$H^2+F^2=(F+\lambda)^2$$  Equation 3

In various embodiments, the process 1300 may include deciding the size of the scatterer 111 of the unit cell 110 such that the size coincides with the target gradient index profile. One layer is the aggregate 120 in which the unit cells having scatterers with the same size are arranged, and thus may have one gradient index. The gradient index of each layer may be adjusted according to the size of the scatterer. The target gradient index profile may indicate the gradient index profile of the super cell in the vertical direction (Y-axis direction), and the gradient index of an aggregate or the one layer may be decided by the size of the scatterer of the unit cell. Therefore, the size of the scatterer may be decided for each of the layers. For example, the lowermost layer of the super cell may have the smallest scatterer and thus have the maximum gradient index profile, and the uppermost layer of the super cell may have the largest scatterer and thus have the minimum gradient index profile, on the basis of the maximum gradient index and the minimum gradient index which are decided in the process 1100. When the sizes of the scatterers corresponding to the uppermost layer and the lowermost layer are decided, the sizes of the scatterers corresponding to the layers between the uppermost layer and the lowermost layer may be decided. The sizes of the scatterers corresponding to the layers between the uppermost layer and the lowermost layer may be differently calculated depending on the target gradient index profile, i.e. the purpose of the gradient-index phononic crystal flat lens in which the super cells are stacked.

The gradient-index phononic crystal flat lens 200 according to the embodiment aims at controlling the behavior of an acoustic wave incident in a vertical direction such that refracted waves exiting at angles $-\theta$ and $\theta$ overlap each other, and then exit in the form of a Bessel beam. In this case, the target gradient index profile, i.e. a gradient index $n(y)$ of the super cell 201 in the vertical direction (Y-axis direction) may linearly increase, as expressed in Equation 4, within the range from the minimum gradient index to the maximum gradient index, because the super cell needs to form a plane wave exiting at a predetermined refraction angle $\theta$.

$$n(y)=|y|\sin\theta/W+n(0) \qquad \text{Equation 4}$$

Here, y represents the height of each layer.

The gradient-index phononic crystal flat lens 300 according to the another embodiment aims at controlling the behavior of an acoustic wave, such that the acoustic wave propagating as the wavefront of a concentric circle from a source point is incident thereon, and exits as a plane wave. The gradient-index phononic crystal flat lens according to the another embodiment may be a collimator. In this case, the propagation paths of acoustic waves may have the same length from the source point to an exit surface, regardless of whether the acoustic waves propagate at any heights of the super cell 301, in order to allow a plane wave to exit while propagating n a direction perpendicular to the flat lens. The lengths may be expressed as Equation 5 below. The target gradient index profile, i.e. the gradient index $n(y)$ of the super cell in the vertical direction (Y-axis direction) may be summarized as Equation 7 by combining Equation 5 and Equation 6 induced from the structure illustrated in FIG. 8.

$$k_o(F+S)+\Phi(y)=k_oF+\Phi(0) \qquad \text{Equation 5}$$

$$y^2+F^2=(F+s)^2 \qquad \text{Equation 6}$$

$$n(y)=\frac{\sqrt{y^2+F^2}}{W}+n(0) \qquad \text{Equation 7}$$

Here, F represents the focal distance of the collimator, and y represents the height of each layer.

In various embodiments, in the process 1400, the scatterer having the size decided in the process 1300 and the divider 130 provided between the neighboring layers may be formed in the unit cell. As the scatterer is formed in the center of the unit cell and the portions 112a and 112b of the divider are formed at the top and bottom of the unit cell, respectively, the super cell according to the various embodiments may be completed. For example, as the scatterer 111 is formed as a circular hole in the center of the unit cell and the bar-shaped holes are formed at the top and bottom of the unit cell, respectively, the super cell according to the various embodiments may be completed.

In various embodiments, the process 1500 may include deciding the stacking number and direction of the super cells formed in the process 1400. The stacking number and direction of the super cells may be differently decided depending on the purpose of the gradient-index phononic crystal flat lens.

Figure 5:
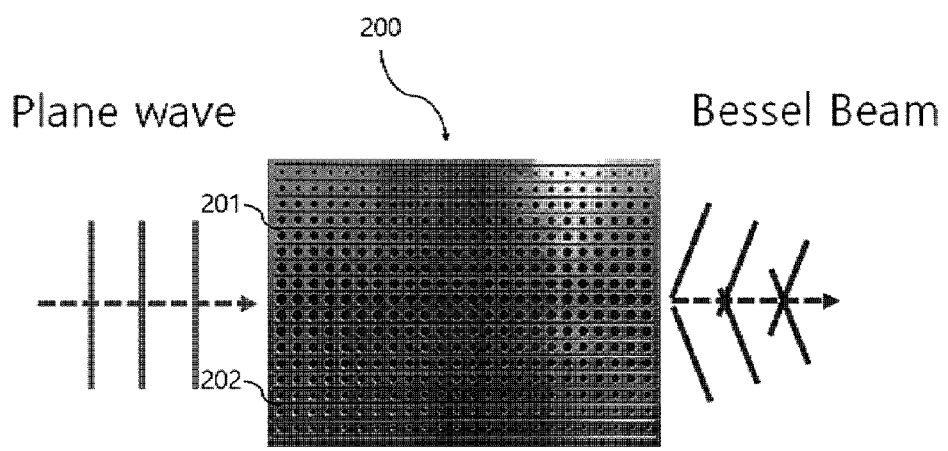
FIG. 5 is a diagram for describing the gradient-index phononic crystal flat lens according to the embodiment.

FIG. 5 is a diagram illustrating the gradient-index phononic crystal flat lens according to the embodiment.

Referring to FIGS. 4 and 5, the gradient-index phononic crystal flat lens 200 according to the embodiment aims at controlling the behavior of an acoustic wave incident in a vertical direction such that refracted waves exiting at angles and overlap each other, and then exit in the form of a Bessel beam. In this case, when at least two super cells including first and second super cells 201 and 202 are stacked symmetrically with respect to an axis of y=0, the gradient-index phononic crystal flat lens 200 according to the embodiment may be implemented.

Figure 9:
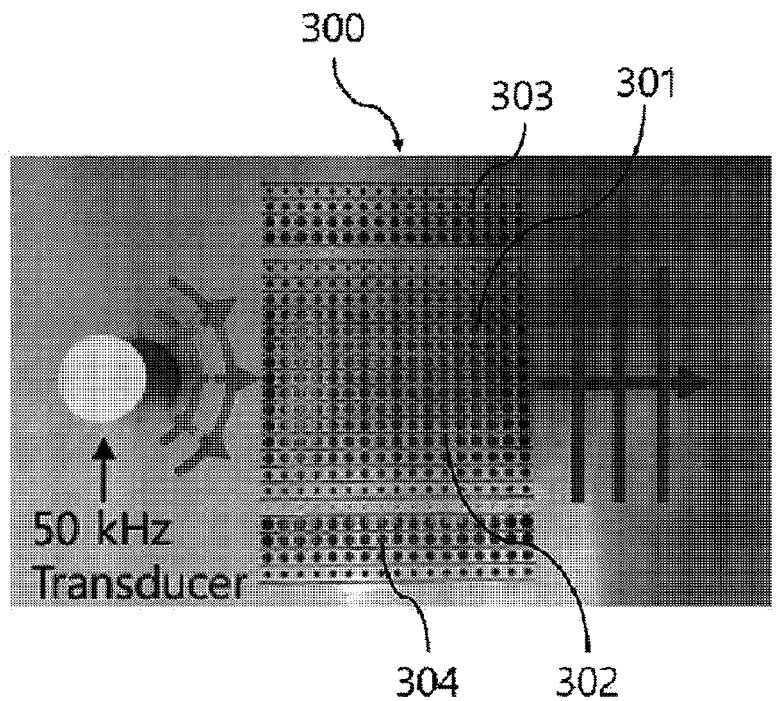
FIG. 9 is a diagram illustrating the gradient-index phononic crystal flat lens according to the another embodiment.

FIG. 9 is a diagram illustrating the gradient-index phononic crystal flat lens according to the another embodiment.

Referring to FIG. 9, the gradient-index phononic crystal flat lens 300 according to the another embodiment aims at controlling the behavior of an acoustic wave, such that an acoustic wave propagating as the wavefront of a concentric circle from a source point is incident thereon, and exits as a plane wave. The gradient-index phononic crystal flat lens according to the another embodiment may be a collimator. In this case, when a third super cell 301 and a fourth super cell 302 are stacked symmetrically with respect to an axis of y=0, a fifth super cell 303 is stacked over the third super cell 301 in a forward direction, and a sixth super cell 304 is stacked under the fourth super cell 302 so as to be symmetrical with the fifth super cell with respect to the axis of y=0, the gradient-index phononic crystal flat lens 300 according to the another embodiment may be implemented.

Figure 6A:
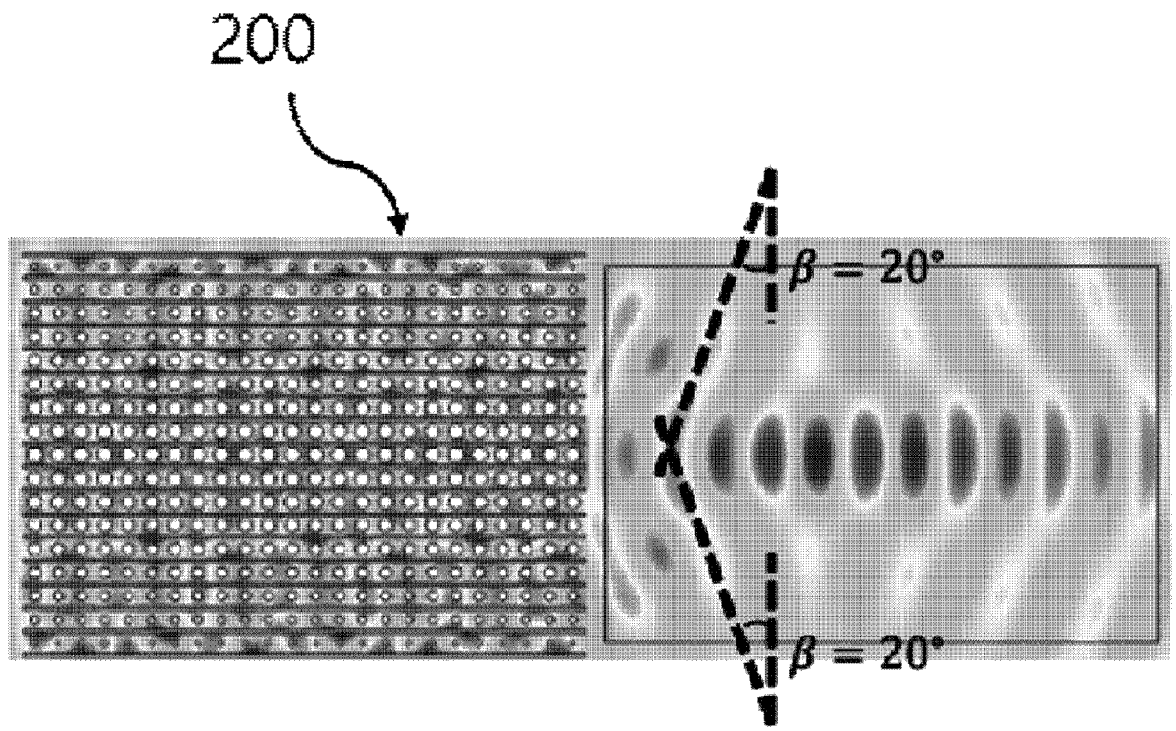
FIG. 6A is a simulation diagram illustrating a wave control process of the gradient-index phononic crystal flat lens according to the embodiment.
Figure 6B:
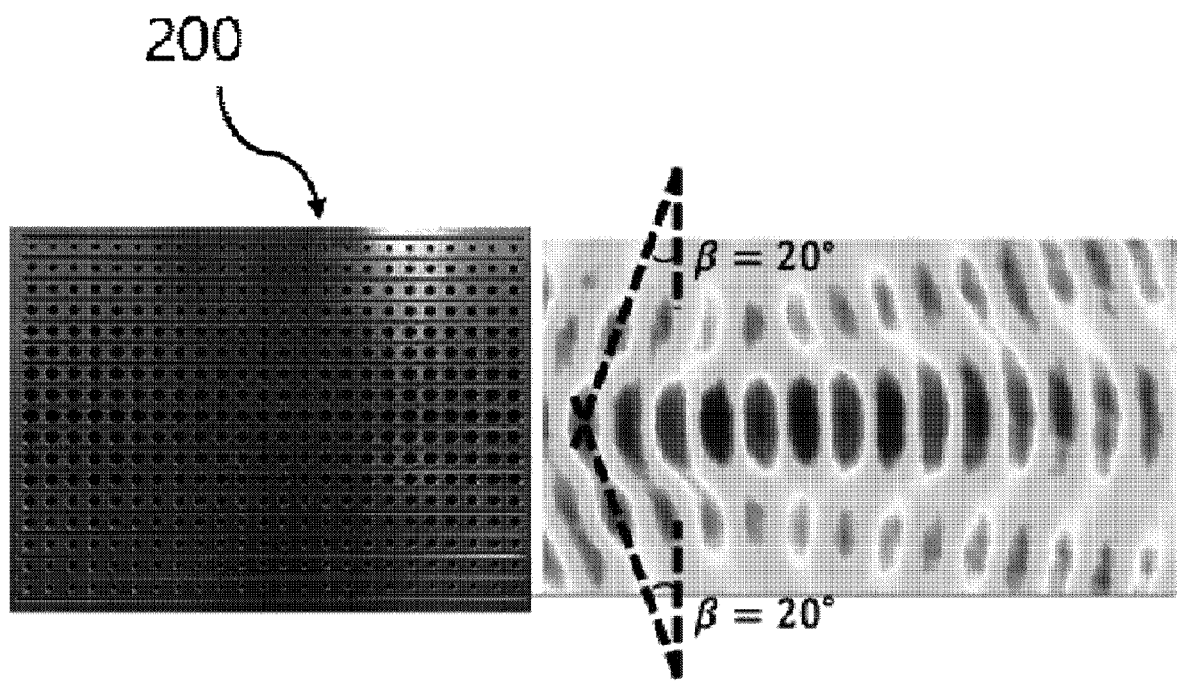
FIG. 6B is a simulation diagram illustrating a wave control process of the gradient-index phononic crystal flat lens according to the embodiment.

FIG. 6A is a simulation diagram illustrating a wave control process of the gradient-index phononic crystal flat lens according to the embodiment, and FIG. 6B is a simulation diagram illustrating a wave control process of the gradient-index phononic crystal flat lens according to the embodiment.

Referring to FIGS. 6A and 6B, the gradient-index phononic crystal flat lens 200 according to the embodiment may control the behavior of an acoustic wave incident in a vertical direction such that refracted waves exiting at tilted angles $-\beta$ and $\beta$ overlap each other, and then exit in the form of a Bessel beam.

Figure 10A:
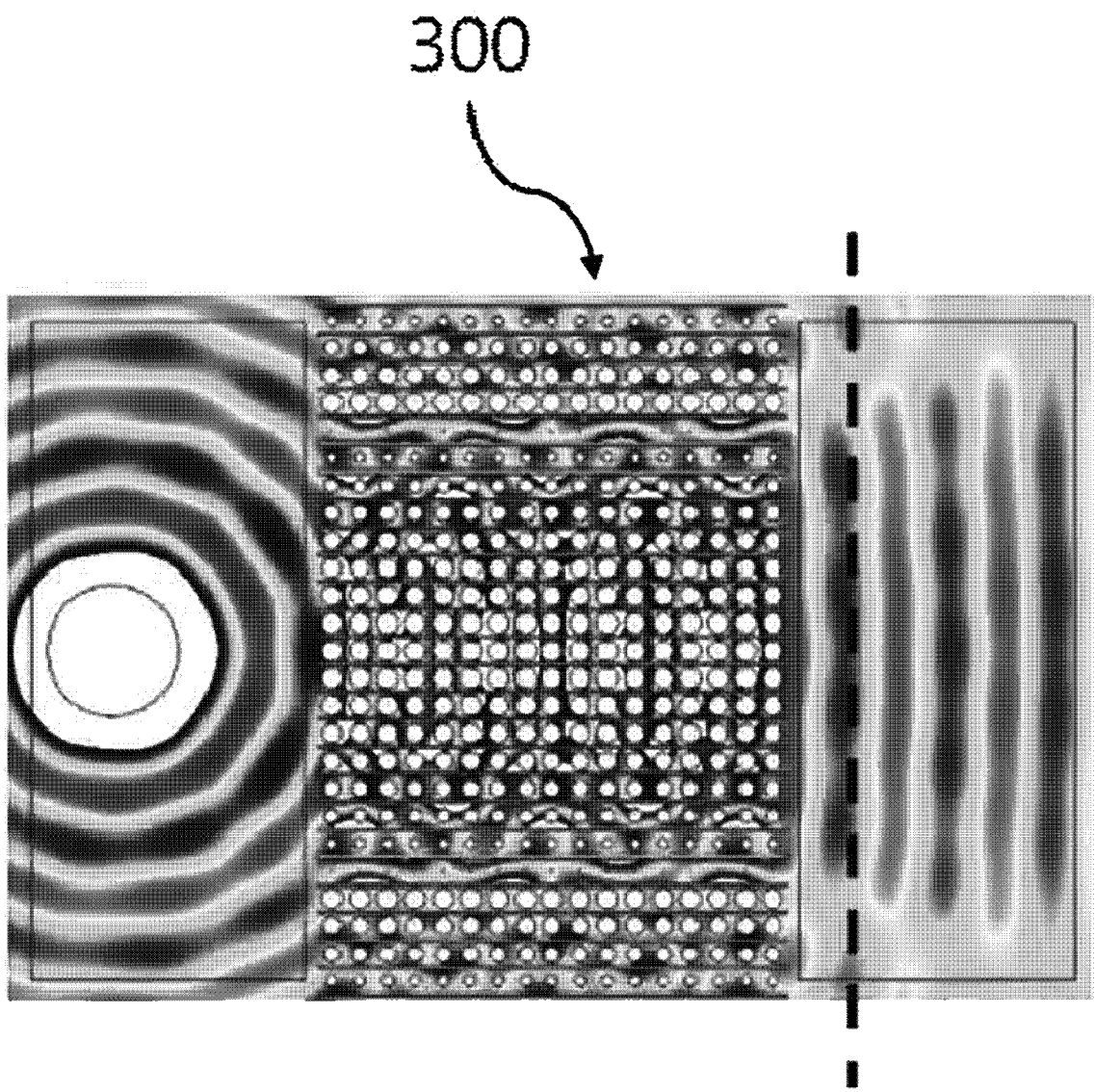
FIG. 10A is a simulation diagram illustrating a wave control process of the gradient-index phononic crystal flat lens according to the another embodiment.
Figure 10B:
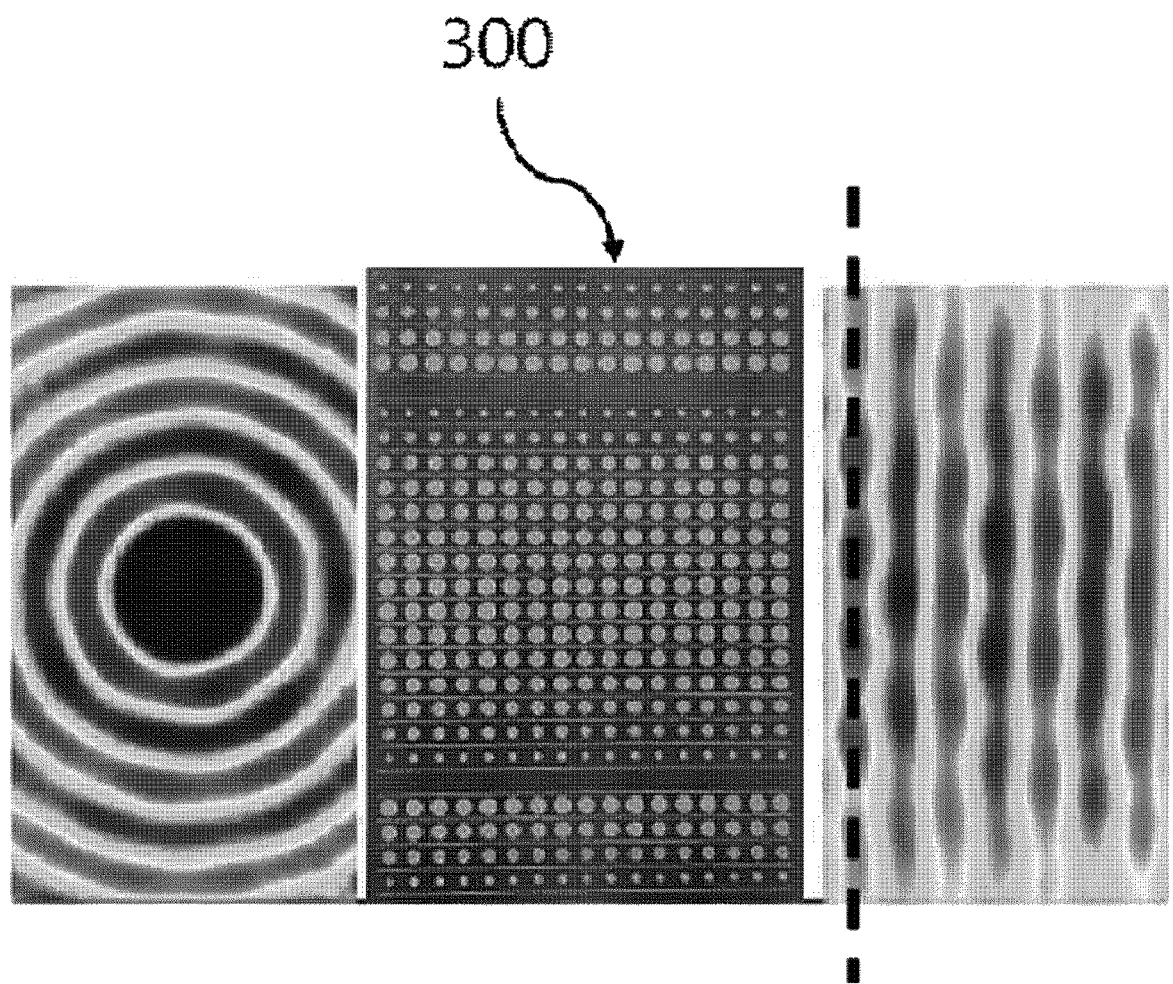
FIG. 10B is a simulation diagram illustrating the wave control process of the gradient-index phononic crystal flat lens according to the another embodiment.

FIG. 10A is a simulation diagram illustrating a wave control process of the gradient-index phononic crystal flat lens according to the another embodiment, and FIG. 10B is a simulation diagram illustrating a wave control process of the gradient-index phononic crystal flat lens according to the another embodiment.

Referring to FIGS. 10A and 10B, the gradient-index phononic crystal flat lens 300 according to the another embodiment may control the behavior of an acoustic wave, such that an acoustic wave propagating as the wavefront of a concentric circle from a source point is incident thereon, and exits as a plane wave. In this case, the gradient-index phononic crystal flat lens according to the another embodiment may be a collimator.

The invention claimed is:

1. A gradient-index phononic crystal flat lens which controls a behavior of an acoustic wave having a designated frequency, the gradient-index phononic crystal flat lens comprising one or more super cells each having a plurality of layers stacked in a vertical direction according to a target gradient index profile, wherein each of the layers is composed of an aggregate in which unit cells having scatterers formed with a same size in centers thereof are arranged in a horizontal direction,
wherein the one or more super cells each comprise a divider provided between neighboring layers, and configured to force the acoustic wave to propagate in the horizontal direction within the gradient-index phononic crystal flat lens, wherein the divider comprises a bar-shaped hole.

2. The gradient-index phononic crystal flat lens of claim 1, wherein the scatterer formed in the center of the unit cell comprises a circular hole.

3. The gradient-index phononic crystal flat lens of claim 1, wherein a width of the super cell is decided so that the acoustic waves propagating through the layer with a minimum gradient index and the layer with a maximum gradient index, respectively, have a phase difference of $2\pi$ therebetween.

4. The gradient-index phononic crystal flat lens of claim 3, wherein the target gradient index profile is linearly changed in a range between the minimum gradient index and the maximum gradient index.

5. The gradient-index phononic crystal flat lens of claim 4, wherein the super cell comprises a first super cell and a second super cell, and the first super cell is stacked over the second super cell such that the gradient index profile of the first super cell and the gradient index profile of the second super cell become symmetrical with each other.

6. The gradient-index phononic crystal flat lens of claim 3, wherein the target gradient index profile is decided by the following equation:

$$n(y) = \frac{\sqrt{y^2 + F^2}}{W} + n(0),$$

wherein n(y) represents the target gradient index profile of the super cell in a Y-axis corresponding to the vertical direction, W represents the width of the super cell, F represents a linear distance between the super cell and a wave source configured to form the acoustic wave, and n(0) represents a gradient index when a height position of the super cell correspond to an axis of y=0.

7. The gradient-index phononic crystal flat lens of claim 6, wherein the super cell comprises a third super cell, a fourth supper cell, a fifth super cell, and a sixth super cell, wherein the third and fourth super cells are stacked so as to be symmetrical with each other with respect to the axis of y=0, the fifth super cell is stacked over the third super cell, and the sixth super cell is stacked under the fourth super cell so as to be symmetrical with the fifth super cell with respect to the axis of y=0.

8. A design method for a gradient-index phononic crystal flat lens which controls a behavior of an acoustic wave having a designated frequency, the design method comprising:
calculating a maximum gradient index and a minimum gradient index which a unit cell corresponding to one unit of the gradient-index phononic crystal flat lens is able to have;
calculating a width and height of a super cell having a plurality of layers stacked in a vertical direction with a target gradient index profile, wherein each of the layers is composed of an aggregate in which unit cells having scatterers formed with a same size in centers thereof are arranged in a horizontal direction;
deciding the sizes of the scatterers of the unit cells arranged in the layer such that the sizes coincide with the target gradient index profile; and
forming the scatterer with the decided size and a divider in the unit cell, the divider being provided between neighboring layers, wherein the divider comprises a bar-shaped hole.

9. The design method of claim 8, wherein the scatterer formed in the center of the unit cell comprises a circular hole.

10. The design method of claim 8, wherein the calculating of the width and height of the super cell comprises calculating the width of the super cell such that the acoustic waves propagating through the layer with the minimum gradient index and the layer with the maximum gradient index, respectively, have a phase difference of $2\pi$ therebetween.

11. A gradient-index phononic crystal flat lens which controls a behavior of an acoustic wave having a designated frequency, the gradient-index phononic crystal flat lens comprising one or more super cells each having a plurality of layers stacked in a vertical direction according to a target gradient index profile, wherein each of the layers is composed of an aggregate in which unit cells having scatterers formed with a same size in centers thereof are arranged in a horizontal direction,
wherein the one or more super cells each comprise a divider provided between neighboring layers, and configured to force the acoustic wave to propagate in the horizontal direction within the gradient-index phononic crystal flat lens, and
wherein a width of the super cell is decided so that the acoustic waves propagating through the layer with a minimum gradient index and the layer with a maximum gradient index, respectively, have a phase difference of $2\pi$ therebetween.

\* \* \* \* \*